United States Patent [19]

Himy et al.

[11] 4,084,047

[45] Apr. 11, 1978

[54] STABLE ALKALINE ZINC ELECTRODE

[75] Inventors: Albert Himy, University Park, Md.;
Otto C. Wagner, Long Branch, N.J.

[73] Assignee: The United States of America as represented by the Secretary of the Navy, Washington, D.C.

[21] Appl. No.: 745,758

[22] Filed: Nov. 29, 1976

[51] Int. Cl.² .............................................. H01M 6/04
[52] U.S. Cl. .................................. 429/206; 429/219; 429/229
[58] Field of Search .............................. 429/229–231, 429/219, 206; 252/512, 518

[56] References Cited

U.S. PATENT DOCUMENTS

| | | | |
|---|---|---|---|
| 3,623,911 | 11/1971 | Oswin | 429/229 X |
| 3,785,868 | 1/1974 | Devitt | 429/230 |
| 4,022,953 | 5/1977 | Charkey | 429/229 |

*Primary Examiner*—Charles F. LeFevour
*Attorney, Agent, or Firm*—R. S. Sciascia; A. L. Branning; R. D. Johnson

[57] ABSTRACT

A zinc electrode containing a minor amount of (a) $Tl_2O_3$, (b) PbO, (c) CdO or mixtures of (d) $Tl_2O_3$ and PbO, (e) $Tl_2O_3$ and CdO, (f) $Tl_2O_3$ and $SnO_2$, (g) $Tl_2O_3$ and $In(OH)_3$, (h) $Tl_2O_3$ and $Ga_2O_3$, (i) PbO and CdO, (j) PbO and $SnO_2$, (k) PbO and $In(OH)_3$, and (l) PbO and $Ga_2O_3$, to reduce "shape change" and hydrogen gassing of the zinc electrode which is used as the anode in an alkaline battery.

76 Claims, No Drawings

STABLE ALKALINE ZINC ELECTRODE

BACKGROUND OF THE INVENTION

This invention relates to secondary batteries and more particularly to secondary batteries having pressed or rolled powdered-type zinc anode in the uncharged and/or charged status.

Pure zinc-zinc oxide anodes in alkaline electrolytes generate hydrogen gas, with the gassing rate increasing with increasing temperature. The hydrogen gas forms on the cathodic sites of the anode by the decomposition of water. This hydrogen gas generation is particularly undesirable in sealed batteries where it can result in excessive pressure build up. Simultaneous to the hydrogen gas generation, active zinc at the anodic sites self-discharges into zinc hydroxide, zinc oxide, or mixtures of zinc hydroxide and zinc oxide, with a resulting loss in electrical capacity by the anodes. The overall self-discharge reactions are as follows:

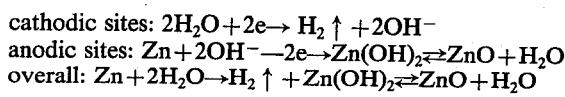

cathodic sites: $2H_2O + 2e^- \rightarrow H_2 \uparrow + 2OH^-$
anodic sites: $Zn + 2OH^- - 2e^- \rightarrow Zn(OH)_2 \rightleftarrows ZnO + H_2O$
overall: $Zn + 2H_2O \rightarrow H_2 \uparrow + Zn(OH)_2 \rightleftarrows ZnO + H_2O$ Pure zinc-zinc oxide electrodes also lose electrical capacity on storage by the growth of zinc oxide crystals from active submicron-sized prismatic crystals to large, relatively inactive, orthorhombic crystals, up to 50 microns in diameter or greater. This process is also referred to as "aging."

A common prior art method for preventing the self discharge reaction of the alkaline zinc-zinc oxide anode is to raise the hydrogen overpotential of the anode by mixing or alloying the active zinc and its supporting grid (usually copper or silver structures) with 0.5 to 5.0 percent by weight of mercury or mercuric oxide. The mercury additive also minimizes passivation at high discharge rates and at low temperatures. To a small but appreciable extent mercury also reduces the "aging" rate of the zinc oxide crystals.

The major shortcoming of mercury (or mercuric oxide) as an additive to the alkaline zinc-zinc oxide anode is that it dissolves into the zinc lattice, forming an amalgamated surface with a reduced surface energy, or a lower activation overpotential, for the electrochemical exchange of ions during the charge/discharge reactions of the secondary battery. The amalgamated zinc surface practically eliminates the adatom diffusion step since the adatoms (surface adsorped species) can be incorporated at any point on an amalgamated surface. This phenomenon increases the rate of zinc corrosion and densification of the active zinc-zinc oxide material, processes which result in a fairly rapid loss in electrical capacity during the repetitive charge/discharge cycling of the battery. This capacity loss is accomplished by a rapid decrease in the real and the apparent surface areas of the anode, a process usually referred to as "shape change." For the same reasons, alloys of zinc and other additive metals produce cells which will show severe losses in capacity upon cycling.

U.S. Pat. No. 3,580,740 issued to Herbert I. James and U.S. Pat. No. 3,639,176 issued to George F. Nordblom and Herbert I. James disclose the use of mercuric sulfide, lead sulfide, or mixtures of mercuric sulfide and lead sulfide as hydrogen gas suppressant additives for zinc-zinc oxide anodes. Although these additives did not reduce the capacity of the battery as much as mercuric oxide did during cycling, they were much less effective in reducing the generation of the hydrogen gas.

SUMMARY OF THE INVENTION

Accordingly it is an object of this invention to reduce the degree of shape change of the zinc-zinc oxide anode which occurs during charge-discharge cycling of the battery.

Another object of this invention is to help maintain the electrical capacity of batteries having zinc-zinc oxide anodes during charge-discharge cycling.

A further object of this invention is to reduce the generation of hydrogen gas at zinc-zinc oxide anodes in alkaline electrolytes.

Yet another object of this invention is to prevent or reduce the passivation of alkaline zinc-zinc oxide anodes at high discharge rates and low temperatures.

A still further object of this invention is to reduce or prevent the self-discharge of the alkaline zinc-zinc oxide anode upon standing in the charge state.

These and other objectives of this invention are achieved by adding to the zinc active material of a zinc electrode one of the following:

(a) from about 0.1 to about 5.0 weight percent of $Tl_2O_3$,
(b) from about 0.5 to about 10.0 weight percent of PbO,
(c) from about 0.1 to about 5.0 weight percent of CdO,
(d) a mixture of from about 0.1 to about 5.0 weight percent of $Tl_2O_3$ and from about 0.5 to about 10.0 weight percent of PbO,
(e) a mixture of from about 0.1 to about 5.0 weight percent of $Tl_2O_3$ and from about 0.1 to about 5.0 weight percent of CdO,
(f) a mixture of from about 0.1 to about 5.0 weight percent of $Tl_2O_3$ and from about 0.1 to about 5.0 weight percent of $SnO_2$,
(g) a mixture of from about 0.1 to about 5.0 weight percent of $Tl_2O_3$ and from about 0.1 to about 5.0 weight percent of $In(OH)_3$,
(h) a mixture of from about 0.1 to about 0.5 weight percent of $Tl_2O_3$ and from about 0.1 to about 5.0 weight percent of $Ga_2O_3$,
(i) a mixture of from about 0.5 to about 10.0 weight percent of PbO and from about 0.1 to about 5.0 weight percent of CdO,
(j) a mixture of from about 0.5 to about 10.0 weight percent of PbO and from about 0.1 to about 5.0 weight percent of $SnO_2$,
(k) a mixture of from about 0.5 to about 10.0 weight percent of PbO and from about 0.1 to about 5.0 weight percent of $In(OH)_3$, and
(l) a mixture of from about 0.5 to about 10.0 weight percent of PbO and from about 0.1 to about 5.0 weight percent of $Ga_2O_3$.

All of the above weight percentages are based upon the total weight of the zinc active material plus the additive or binary additive mixture in the uncharged zinc anode.

DETAILED DESCRIPTION OF THE PREFERRED EMBODIMENT

In accordance with this invention, minor amounts of $Tl_2O_3$, PbO, CdO, or mixtures of $Tl_2O_3$ and PbO, $Tl_2O_3$ and CdO, $Tl_2O_3$ and $SnO_2$, $Tl_2O_3$ and $In(OH)_3$, $Tl_2O_3$ and $Ga_2O_3$, PbO and CdO, PbO and $SnO_2$, PbO and $In(OH)_3$, or PbO and $Ga_2O_3$ are added to the major constituent of a zinc-zinc oxide electrode (i.e., the zinc active material which can be zinc oxide, powdered zinc metal, or mixtures thereof). These additives reduce or inhibit the generation of hydrogen gas when the electrode is used as the anode in a secondary alkaline electrochemical cell. Also it has been found that the capacity of an alkaline zinc cell, particularly a silver-zinc cell, is maintained at a higher level during charge-discharge cycling when these additives are present than when a blank zinc electrode or a zinc electrode containing a conventional HgO additive is used. Further, the shape change of the zinc electrode is minimized by using the additives of the present invention in place of HgO as the gassing suppressant. Moreover, these additives minimize the amount of passivation which occurs to the anode at high rates of discharge, particularly at low temperatures. Finally, these additives minimize the self discharge of the anode which occurs when the cell stands for a substantial period of time in the charged state.

The zinc active material and each of the additives are in the form of powders whose particles are preferrably submicron in size. The zinc active material and additive powders are intimately mixed. The mixture may be conveniently formed by thoroughly mixing the zinc active material and additive powders together in a water slurry and then drying to form a dry mixture. This mixture may then be formed into an electrode by using state of the art pressed powder or paste techniques. Note that alloy mixtures or solutions of additives and zinc are excluded from this invention as they result in secondary cells which lose too much of their capacity upon cycling.

A substantial reduction in the generation of hydrogen gas can be achieved by adding one of the following additives to the zinc-zinc oxide anode: (a) from about 0.1 to about 5.0 percent of $Tl_2O_3$ (b) from about 0.5 to about 10.0 percent of PbO, and (c) from about 0.1 to about 5.0 percent of CdO. Note that throughout the specification and percentages given for the additives are weight percentages based upon the total weight of the additive plus the active zinc material (zinc oxide in the discharge state) in the electrode. Preferred ranges of these additives are from 0.5 to 2.0 percent for $Tl_2O_3$, from 1.0 to 5.0 percent for PbO, and from 0.5 to 2.0 percent for CdO. Of these additives, $Tl_2O_3$ is the most preferred because of its superior ability to inhibit the formation of hydrogen gas.

$SnO_2$, $In(OH)_3$, and $Ga_2O_3$ were tested as degassing additives because in terms of hydrogen overpotential on zinc in alkali they are theoretically similar to $Tl_2O_3$, PbO, and CdO. However, $SnO_2$, $In(OH)_3$, and $Ga_2O_3$ when used alone were found to be unacceptable as zinc anode additives for various reasons. For instance, the addition of $SnO_2$ to the zinc electrode actually increased the rate of hydrogen gassing as compared to a pure zinc anode. On the other hand, $In(OH)_3$ reduced hydrogen gassing but it increased the degree of passavation to an unacceptable level. Similarly, although $Ga_2O_3$ reduced the rate of hydrogen gassing, it also reduced the capacity of the cell during cycling by almost as much as HgO did. Further, $Ga_2O_3$ decreased the ability of the cell to hold a charge while standing for long periods of time. In summary $SnO_2$, $In(OH)_3$, and $Ga_2O_3$ when used alone were found to be unacceptable.

A synergistic effect is achieved when $Tl_2O_3$, PbO, and CdO powders are added in pairs to the zinc active material. In other words, binary additive mixtures of $Tl_2O_3$ and PbO, $Tl_2O_3$ and CdO, or CdO and PbO mixed in with the zinc active material virtually eliminate the generation of hydrogen gas at the zinc anode and at the same time improve capacity maintenance of silver-zinc cells on cycling by a factor of two to three as compared with standard silver-zinc cells using HgO as the gassing suppressant. Moreover, $SnO_2$, $In(OH)_3$, and $Ga_2O_3$ when mixed with either $Tl_2O_3$ or PbO produce binary additive mixtures which produce similar beneficial, synergistic effects. More specifically, the following binary mixtures:

(a) from about 0.1 to about 5.0 weight percent of $Tl_2O_3$ with from about 0.5 to about 10.0 weight percent of PbO, (b) from about 0.1 to about 5.0 weight percent of $Tl_2O_3$ with from about 0.1 to about 5.0 weight percent of CdO, (c) from about 0.1 to about 5.0 weight percent of $Tl_2O_3$ with from about 0.1 to about 5.0 weight percent of $SnO_2$, (d) from about 0.1 to about 5.0 weight percent of $Tl_2O_3$ with from about 0.1 to about 5.0 weight percent of $In(OH)_3$, and (e) from about 0.1 to about 5.0 weight percent of $Tl_2O_3$ with from about 0.1 to about 5.0 weight percent of $Ga_2O_3$, (f) from about 0.5 to about 10.0 weight percent of PbO with from about 0.1 to about 5.0 weight percent of CdO, (g) from about 0.5 to about 10.0 weight percent of PbO with from about 0.1 to about 5.0 weight percent of $SnO_2$, (h) from about 0.5 to about 10.0 weight percent of PbO with from about 0.1 to about 5.0 weight percent of $In(OH)_3$, and (i) from about 0.5 to about 10.0 weight percent of PbO with from about 0.1 to about 5.0 weight percent of $Ga_2O_3$ will maintain 95 percent or better of the capacity of the cell under the rapid cycling test procedure outlined in the examples. Preferred ranges for each of the additives when used in the binary mixtures are from 0.5 to 2.0 weight percent for $Tl_2O_3$, from 1.0 to 5.0 weight percent for PbO, from 0.5 to 2.0 weight percent for CdO, from 0.5 to 2.0 weight percent for $In(OH)_3$, and from 0.5 to 2.0 weight percent for $Ga_2O_3$. The weight percentages are based on the total weight of the binary additive mixtures plus the active zinc material in the electrode in the discharged state. Mixtures in the preferred ranges, in addition to suppressing hydrogen gassing and improving cell capacity on cycling, also showed no detectible amount of passivation during the low temperature-high discharge test (column 6 of the table) and only a small degree of self discharge during the charge stand test (column 5 of the table). The table as well as a description of the test procedures are located in the example section.

The alkaline electrolytes of the cells convert CdO into $Cd(OH)_2$ and PbO into $Pb(OH)_2$. Therefore, for purposes of this invention, $Cd(OH)_2$ or mixtures of $CD(OH)_2$ and CdO are equivalent to CdO as additives. Likewise, $Pb(OH)_2$ or mixtures of $Pb(OH)_2$ and PbO are equivalent to PbO as additives.

Water soluble salts of cadmium and lead whose cations will not interfere with operation of the cell may be used as substitutes for CdO and PbO. Examples of such salts are the chlorides, $CdCl_2$ and $PbCl_2$, and sulfates $CdSO_4$ and $PbSO_4$. In the presence of alkaline electrolytes these salts will be converted in to the corresponding hydroxides, $Cd(OH)_2$ and $Pb(OH)_2$. On the other hand, insoluble salts such as CdS and PbS cannot be used as a substitute for the cadmium or lead oxides.

As will be apparent to one skilled in the art, the additives described in this specification can be used to improve the performance of zinc-zinc oxide anodes in silver-zinc, nickel-zinc, zinc-air, zinc-oxygen, zinc-manganese dioxide, zinc-mercury, zinc-copper oxide, and other similar alkaline cells.

The general nature of the invention having been set forth, the following examples are presented as specific illustrations thereof. It will be understood that the invention is not limited to these examples but is susceptible to various modifications that will be recognized by one of ordinary skill in the art.

EXAMPLES

Each of the cells tested in the examples consisted of a single test zinc anode sandwiched between two silver cathodes. The pertinent design parameters were:

Zinc Anode (1)

Weight of mix (zinc oxide and additive(s)): 7.45 grams
Width: 2.000 inches
Height: 1.625 inches
Thickness: 0.065 ± 0.002 inches
Grid: 5Ag7 — 2/0 silver exmet (expanded mesh)
Theoretical capacity: 4.90 ampere - hours The additives were mixed into the zinc oxide thoroughly before the electrode was prepared. For best results, the average diameter of the additive particles should be less than one micron in diameter. Also, 10 drops (1/20 cc per drop) of water was added prior to pressing the electrode to size; this water served as binder. The wrap for the zinc anode was made of 0.002 inch thick onion skin paper.

Silver Cathodes (2) (from Eagle-Picher)

Width: 1⅞ inches
Height: 1½ inches
Thickness: 0.013 inches ± .005 inches
Theoretical capacity: 1.5 ampere-hours/plate
Total active area: 4.62 in²

Other Features of the Cells electrolyte: 42 percent KOH saturated with zincate
cell cases: ABS mon block
reference electrode: a partially charged $Ni(OH)_2$ electrode,
wrapped in two layers of cellophane and located at the end of the electrode pack.
Separator system: accordion of (+) / 1 × 0.005 inches polymide Pellon 2506K bag / 2 × 0.003 inches fibrous sausage casing/onion skin paper wrapped (−).

Cell Formation

After a slow vacuum filling and a 48 hour soak, the cells were given one formation cycle at room temperature as follows:

(1) charged at 75 milliamperes (12 mA/in²) for 32 hours. (Note: all of the charging in the cell formation and cell tests used constant current direct current).

(2) discharged at 250 milliamperes until the anode potential dropped 0.5 volts versus the $Ni(OH)_2$ reference electrode at the end of discharge.

For the rapid cycling, charged stand and low temperature tests the charge input was reduced at 1.50 ampere-hours or 60 percent depth of the actual cell capacity. This was done to assure that the cells could be cycled and tested under zinc limiting conditions. In addition, all shallow cycling and testing commenced from a zero state of charge for both electrodes Cell Tests and Experimental Results Four tests were used to evaluate each of the cells: the gassing test (test 1), the charge stand test (test 2), the low temperature-rapid discharge test (test 3), and the rapid cycling-shape change test (test 4). In the gassing test the cells were submerged in a constant temperature water bath at 100° F after being charged at 100 milliamperes at room temperature for 15 hours. One end of a thin Tygon tube was epoxy-sealed to the cell vent and the other end was inserted into the mouth of an inverted gas collecting tube filled with water. Gasses released by the cells were forced into the water bath via the mouth of the gas tubes. Readings were taken one hour after completion of charge and over a period of 6 days. The rate of gassing (cc/hour) at 140 hours for each of the cells is given in column 1 of the table. The cells were finally discharged at 250 milliamperes until negative limiting (0.5 volt drop by the anode versus a $Ni(OH)_2$ reference).

In the charge stand test, the cells were charged at 100 milliamperes at room temperature for 15 hours. The cells were allowed to stand in the charged state for 7 days at 125° F ± 2° F. The cells were then discharged at 250 milliamperes until negative limiting (0.5 volt drop by the anode versus a $Ni(OH)_2$ reference electrode). The charge stand test data is presented in column 5 of the table.

In the low temperature-rapid discharge test, the cells, in the discharge state, were equilibrated in an environmental test chamber 32° F ± 2° F for 8 hours and then given one cycle as follows: the cells were charged at 100 milliamperes for 15 hours and then discharged at 250 milliamperes until negative limiting (0.5 volt drop by the anode versus a $Ni(OH)_2$ reference electrode). The low temperature-rapid discharge data are given in column 6 of the table. This test provides a measure of the passivation which usually occurs at a high rate of discharge at low temperatures.

Finally, in the rapid cycling-shape change test (test 4), the cells were given 32 cycles at 125° F at about 60 percent depth of discharge (with respect to the initial positive capacity of 2.40 ampere-hours) and then deep discharged at room temperature to determine the true negative capacity. The cells were then opened and the extent of zinc edge corrosion was determined.

The shallow cycling was conducted as follows: The cells were charged at 250 milliamperes at 125° F for 6 hours and then discharged at 250 milliamperes at 125° F until the anode potential dropped 0.5 volts versus the $NI(OH)_2$ reference electrode.

The deep cycling was conducted as follows: The cells were charged at 100 milliamperes at room temperature for 24 hours and then discharged at 250 milliamperes until negative limiting versus the $Ni(OH)_2$ reference electrode. The measured capacities of the cells are recorded in column 2 of the table.

To determine the extent of shape change after rapid cycling, the wet zinc anodes were removed from their cells and inserted into polyethylene bags. The bags were then heat sealed and the shape of the electrode peripheries were traced with a crayon, by which means the percentage of shape retention could be calculated. These percentages are listed in column 3 of the table. The electrode thickness contours were determined with a micrometer and the average thickness for the anode of each cell was calculated. See column 4 of the table for data on the final thicknesses of the anodes.

To summarize, cells 1 through 6 had zinc anodes which were blanks (no additives) or which contained HgO as an additive; these cells served as controls for purposes of comparison. Cells 7 through 29 had zinc anodes which contained $Tl_2O_3$, PbO, or CdO as single additives. Cells 30 through 38 had zinc anodes which contained binary mixtues of $Tl_2O_3$ and PbO, $Tl_2O_3$ and CdO, cells 54 through 56 had zinc anodes which contain binary additive mixtures of $SnO_2$ and CdO, $SnO_2$ and $In(OH)_3$, and $SnO_2$ and $Ga_2O_3$, respectively. The additive percentages represent weight percentages of the total weight of the additives plus zinc active material in the uncharged zinc anode. Test results for these cells are presented in columns 1 through 6 of the table. Column 1 contains the hydrogen gassing rate in cc/hour at 140 hours into test 1. Columns 2, 3, and 4 the results of the rapid cycling test (test 4). Column 2 being the final capacity of the cell after the rapid cycling sequence (the initial capacity of each cell was 2.40 amphere hours). Column 3 presents the percentage of shape retention and column 4 the average thickness of the zinc anodes after the cycling tests. Column 5 presents data which

TABLE

| Cell No. | Additive (Weight percent) | 1. Gassing (cc/hr. at 140 hrs.) (min. 0.000) | 2. Final Capacity (Amp. hrs.) (max. 2.40) | 3. Shape retention (percent) (max. 100.0) | 4. Average Thickness of Zn anode (mils) (65.0 ± 2.0) | 5. Charge Stand (amp-hrs.) (max. 1.50) | 6. Low temperature high discharge rate (amp-hrs) (max. 1.50) |
|---|---|---|---|---|---|---|---|
| 1 | Pure ZnO | 0.160 | 1.78 | 93.0 | 75.0 | 0.87 | 1.33 |
| 2 | Pure ZnO | 0.160 | 2.01 | 89.0 | 75.0 | 0.87 | 1.33 |
| 3 | 0.5 HgO | 0.052 | 1.78 | 91.0 | 73.0 | 1.18 | 1.40 |
| 4 | 1.0 HgO | 0.013 | 1.92 | 67.0 | 80.0 | 1.38 | 1.49 |
| 5 | 1.0 HgO | 0.013 | 1.75 | 58.0 | 80.0 | 1.38 | 1.49 |
| 6 | 2.0 HgO | 0.000 | 1.37 | 58.0 | 81.0 | 1.46 | 1.47 |
| 7 | 0.1 $Tl_2O_3$ | 0.013 | 1.86 | 89.0 | 76.0 | 1.34 | 1.45 |
| 8 | 0.5 $Tl_2O_3$ | 0.000 | 1.88 | 93.0 | 76.0 | 1.35 | 1.39 |
| 9 | 0.5 $Tl_2O_3$ | 0.000 | 2.00 | 92.0 | 76.0 | 1.35 | 1.39 |
| 10 | 1.0 $Tl_2O_3$ | 0.000 | 2.30 | 90.0 | 70.0 | 1.41 | 1.44 |
| 11 | 1.0 $Tl_2O_3$ | 0.000 | 2.14 | 91.0 | 70.0 | 1.41 | 1.44 |
| 12 | 1.0 $Tl_2O_3$ | 0.000 | 2.21 | 92.0 | 70.0 | 1.41 | 1.44 |
| 13 | 2.0 $Tl_2O_3$ | 0.000 | 2.16 | 79.0 | 73.0 | 1.42 | 1.46 |
| 14 | 2.0 $Tl_2O_3$ | 0.000 | 2.11 | 83.0 | 73.0 | 1.42 | 1.46 |
| 15 | 5.0 $Tl_2O_3$ | 0.000 | 2.16 | 84.0 | 76.0 | 1.43 | 1.49 |
| 16 | 0.5 PbO | 0.078 | 2.06 | 94.0 | 73.0 | 1.38 | 1.47 |
| 17 | 1.0 PbO | 0.023 | 2.28 | 95.0 | 70.0 | 1.42 | 1.47 |
| 18 | 1.0 PbO | 0.023 | 2.28 | 90.0 | 70.0 | 1.42 | 1.44 |
| 19 | 2.0 PbO | 0.012 | 2.35 | 96.0 | 69.5 | 1.44 | 1.46 |
| 20 | 2.0 PbO | 0.012 | 2.33 | 95.0 | 69.5 | 1.44 | 1.46 |
| 21 | 2.0 PbO | 0.012 | 2.29 | 94.0 | 69.5 | 1.44 | 1.46 |
| 22 | 5.0 PbO | 0.009 | 2.35 | 97.0 | 67.0 | 1.41 | 1.45 |
| 23 | 0.5 CdO | 0.029 | 2.28 | 98.0 | 70.0 | 1.38 | 1.46 |
| 24 | 0.5 CdO | 0.029 | 2.30 | 96.0 | 70.0 | 1.38 | 1.46 |
| 25 | 1.0 CdO | 0.060 | 2.28 | 87.0 | 75.0 | 1.36 | 1.47 |
| 26 | 1.0 CdO | 0.060 | 2.28 | 92.0 | 75.0 | 1.36 | 1.47 |
| 27 | 1.0 CdO | 0.060 | 2.16 | 86.0 | 75.0 | 1.36 | 1.47 |
| 28 | 2.0 CdO | 0.060 | 2.23 | 84.0 | 76.0 | 1.31 | 1.46 |
| 29 | 2.0 CdO | 0.060 | 2.16 | 87.0 | 76.0 | 1.31 | 1.46 |
| 30 | 0.5 $Tl_2O_3$+2.0 PbO | 0.000 | 2.35 | 90.0 | 76.0 | 1.42 | 1.45 |
| 31 | 0.5 $Tl_2O_3$+5.0 PbO | 0.000 | 2.40 | 93.0 | 66.0 | 1.44 | 1.50 |
| 32 | 1.0 $Tl_2O_3$+1.0 PbO | 0.000 | 2.30 | 89.0 | 68.0 | 1.39 | 1.43 |
| 33 | 1.0 $Tl_2O_3$+2.0 PbO | 0.000 | 2.35 | 95.0 | 65.0 | 1.46 | 1.50 |
| 34 | 1.0 $Tl_2O_3$+5.0 PbO | 0.000 | 2.32 | 95.0 | 65.0 | 1.46 | 1.41 |
| 35 | 1.0 $Tl_2O_3$+0.5 CdO | 0.000 | 2.30 | 96.0 | 64.0 | 1.39 | 1.47 |
| 36 | 1.0 $Tl_2O_3$+2.0 CdO | 0.000 | 2.35 | 96.0 | 65.0 | 1.42 | 1.49 |
| 37 | 1.0 PbO + 0.5 CdO | 0.000 | 2.35 | 96.0 | 64.0 | 1.46 | 1.47 |
| 38 | 2.0 PbO + 1.0 CdO | 0.000 | 2.40 | 96.0 | 65.0 | 1.45 | 1.49 |
| 39 | 1.0 $SnO_2$ | 0.174 | 2.35 | 90.0 | 63.0 | 1.21 | 1.49 |
| 40 | 1.0 $SnO_2$ | 0.200 | 2.30 | 92.0 | 64.0 | 1.30 | 1.47 |
| 41 | 0.1 $In(OH)_3$ | 0.110 | 1.99 | 92.0 | 69.0 | 1.16 | 1.42 |
| 42 | 0.5 $In(OH)_3$ | 0.100 | 1.92 | 95.0 | 70.0 | 1.31 | 1.46 |
| 43 | 1.0 $In(OH)_3$ | 0.037 | 2.10 | 88.0 | 75.0 | 1.28 | 1.25 |
| 44 | 1.0 $In(OH)_3$ | 0.005 | 2.05 | 90.0 | 70.0 | 1.30 | 1.19 |
| 45 | 0.5 $Ga_2O_3$ | 0.072 | 1.38 | 81.0 | 73.0 | 1.17 | 1.37 |
| 46 | 1.0 $Ga_2O_3$ | 0.008 | 1.80 | 94.0 | 70.0 | 1.14 | 1.35 |
| 47 | 1.0 $Ga_2O_3$ | 0.030 | 2.20 | 95.0 | 65.0 | 1.20 | 1.40 |
| 48 | 1.0 $Tl_2O_3$ +1.0 $SnO_2$ | 0.000 | 2.35 | 98.0 | 68.0 | 1.39 | 1.50 |
| 49 | 1.0 $Tl_2O_3$ +1.0 $In(OH)_3$ | 0.000 | 2.10 | 85.0 | 78.0 | 1.42 | 1.43 |
| 50 | 1.0 $Tl_2O_3$ +1.0 $Ga_2O_3$ | 0.000 | 2.25 | 88.0 | 68.0 | 1.45 | 1.50 |
| 51 | 1.0 PbO+1.0 $SnO_2$ | 0.000 | 2.38 | 96.0 | 65.0 | 1.35 | 1.47 |
| 52 | 1.0 PbO+1.0 $In(OH)_3$ | 0.000 | 2.30 | 94.0 | 65.0 | 1.42 | 1.47 |
| 53 | 1.0 PbO+1.0 $Ga_2O_3$ | 0.000 | 2.35 | 95.0 | 66.0 | 1.40 | 1.48 |
| 54 | 1.0 CdO+1.0 $SnO_2$ | 0.103 | 2.29 | 96.0 | 65.0 | 1.25 | 1.49 |
| 55 | 1.0 $In(OH)_3$+1.0 $SnO_2$ | 0.200 | 2.18 | 92.0 | 68.0 | 1.30 | 1.49 |
| 56 | 1.0 $Ga_2O_3$+1.0 $SnO_2$ | 0.092 | 2.10 | 96.0 | 72.0 | 1.20 | 1.45 | or CdO and PbO. Cells 39 through 47 had zinc anodes which contained $SnO_2$, $In(OH)_3$, or $Ga_2O_3$ as single additives. Cells 48 through 50 had zinc anodes which contained binary additive mixtures of $Tl_2O_3$ and $SnO_2$, $Tl_2O_3$ and $In(OH)_3$, and $Tl_2O_3$ and $Ga_2O_3$, respectively. Cells 51 through 53 had zinc anodes which contain binary additive mixtures of PbO and $SnO_2$, PbO and $In(OH)_3$, and PbO and $Ga_2O_3$, respectively. Finally, shows the ability of the cells to maintain a charge while standing at elevated temperature (125° F ± 2° F) for one week (test 2). Finally, column 6 presents data from the low temperature-high discharge rate test which relates to the susceptibility of the zinc anodes to passivation. The difference between the values in column 6 and the input capacity of 1.50 amperes - hours represents the loss in effective charge due to passivation.

The results in the table show that the best single additives with respect to the controls (cells 1-6) are $Tl_2O_3$ (Tl), PbO (Pb) and CdO (Cd), i.e., in terms of minimum rate of gassing (column 1), maximum final capacity (column 2), maximum percent shape retention (column 3), charged stand (column 5) and low temperature performance (column 6). Tl, Pb and Cd, as well as $In(OH)_3$ (In), $Ga_2O_3$ (Ga) and $SnO_2$ (Sn), belong to a family of elements that possess hydrogen evolution exchange current densities equal to or less than that of zinc in alkali. As a result these compounds are potentially good hydrogen gas suppressants. The order of hydrogen gas suppressants in alkali according to the literature being $Tl > Hg > Pb > In > Cd > Sn > Ga$. These elements do not alloy with zinc in the operable temperature range of batteries; alloying with zinc occurs at very high temperatures — from a minimum of 200° C for Sn—Zn to a maximum of 419° C for Tl—Zn. By contrast, mercury readily alloys with zinc, at temperatures as low as $-36°$ C.

When mercury alloys with zinc it behaves as a corrosion accelerator, as is seen by the increasing rate of shape change (column 3) of cells 1–6 with increasing mercury content; i.e., the shape retention decreases from an average of 91.0% for pure ZnO (cells 1 & 2) to 58.0% for 2.0% HgO (cell 6). This adverse relationship is also reflected by the decrease in final capacity (column 2) with increasing mercury content; i.e., from an average of 1.90 Ah for pure ZnO (cells 1 & 2) to 1.37 Ah for 2.0% HgO (cell 6). The Thallium series of elements (Tl, Pb, Cd, In, Ga & Sn), on the other hand, exhibit shape retentions of about 90%, or better, and final capacities of about 2.0 Ah, or better — in their optimum concentrations. These elements, as oxides, or hydroxides, are sparingly soluble in alkaline electrolytes and are believed to behave as beneficial extenders and expanders in the zinc anode (compounds which prevent recrystallization and densification of the active material).

When two different compounds of the Thallium series are employed as binary additive mixtures in the zinc anode ($Tl_2O_3$—PbO, $Tl_2O_3$—CdO, PbO—Cd, etc.), a synergistic relationship develops with respect to the cell performance parameters (column 1–6); that is, the average performance values of the components is exceeded by those of the binary mixtures. In many cases the performance values of the binaries exceed the best values of either components. An excellent examples of the latter is shown by cell No. 38 (2.0% PbO + 1.0% CdO), shown below:

| Gassing (cc/hr): | 1%CdO | | 0.060 | (cells 25–27) |
|---|---|---|---|---|
| | 2% PbO | | 0.012 | (cells 19–21) |
| | 2%PbO + 1% CdO | | 0.000 | (cell 38) |
| | average | | 0.036 | |
| Final Capacity (Ah): | 1%CdO | | 2.24 | (cells 25–27) |
| | 2%PbO | | 2.32 | (cells 19–21) |
| | 2%PbO + 1%CdO | | 2.40 | (cell 37) |
| | average | | 2.28 | |
| Charged Stand (Ah): | 1%CdO | | 1.36 | (cells 25–27) |
| | 2%PbO | | 1.44 | (cells 19–21) |
| | 2%PbO + 1%CdO | | 1.45 | (cell 38) |
| | average | | 1.40 | |
| Low Temperature Test (Ah): | 1%CdO | | 1.47 | (cells 25–27) |
| | 2%PbO | | 1.46 | (cells 19–21) |
| | 2%PbO + 1%CdO | | 1.49 | (cell 38) |
| | average | | 1.47 | |

Synergistic effects similar to those above were found with $Tl_2O_3$ + PbO, $Tl_2O_3$ + CdO, $Tl_2O_3$ + $SnO_2$, $Tl_2O_3$ + $Ga_2O_3$, PbO + $SnO_2$, PbO + $In(OH)_3$, PbO + $Ga_2O_3$, and to a lesser extent with $Tl_2O_3$ + $In(OH)_3$, $SnO_2$ + CdO, $SnO_2$ + $In(OH)_3$, and $SnO_2$ + $Ga_2O_3$.

The more soluble additives of the thallium series in alkaline electrolytes (in this case 42% KOH) are PbO at about $10^{-2}$ moles/liter and $SnO_2$ at about $10^{-3}$ moles/liter; the least soluble are $Tl_2O_3$ at about $10^{-5}$ to $10^{-8}$ moles/liter and $Ga_2O_3$ at about $10^{-4}$ to $10^{-6}$ moles/liter; CdO and $In(OH)_3$ are intermediate in solubility at about $10^{-4}$ moles/liter. For comparison, the ZnO solubility in 42% KOH is very high, at 0.6 moles/liter and HgO (a good gas suppressant) is about $10^{-5}$ moles/liter.

During discharge of the zinc anode in alkaline electrolytes metallic zinc tends to enter solution as a soluble zincate species at the most active sites, particularly at the edges of the electrode. During charge the zincate tends to replace towards the center of the electrode, thereby densifying the anode at the center region while the edges are corroded away. The more soluble compounds of the thallium series, PbO for example, tend to replate on the more active zinc sites during charge. On subsequent discharge the additives block the corrosion of zinc by means of protective passive layers. At the same time, any compound of the thallium series, being sufficiently insoluble in the electrolyte, will prevent any densification of the anode by means of the extender and/or expander effect. In other words, the more soluble members of the thallium series are excellent corrosion inhibitors of zinc while all members of the series are excellent extenders and expanders. In addition, it should be noted that the least soluble compound of the series, $Tl_2O_3$, shows up as the best gas suppressant — even better than the conventional HgO additive. It appears, therefore, any two members of the thallium series, with a sufficient difference in solubility, will exhibit a synergistic effect in terms of the overall battery performance.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An zinc electrode comprising a zinc active material and a binary additive mixture selected from the group consisting of:

(a) from about 0.1 to about 5.0 weight percent of $Tl_2O_3$ with from about 0.5 to about 10.0 weight percent of PbO;

(b) from about 0.1 to about 5.0 weight percent of $Tl_2O_3$ with from about 0.1 to about 5.0 weight percent of CdO;

(c) from about 0.1 to about 5.0 weight percent of $Tl_2O_3$ with from about 0.1 to about 5.0 weight percent of $SnO_2$;

(d) from about 0.1 to about 5.0 weight percent of $Tl_2O_3$ with from about 0.1 to about 5.0 weight percent of $In(OH)_3$;

(e) from about 0.1 to about 5.0 weight percent of $Tl_2O_3$ with from about 0.1 to about 5.0 weight percent of $Ga_2O_3$;

(f) from about 0.5 to about 10.0 weight percent of PbO with from about 0.1 to about 5.0 weight percent of CdO;

(g) from about 0.5 to about 10.0 weight percent of PbO with from about 0.1 to about 5.0 weight percent of $SnO_2$;

(h) from about 0.5 to about 10.0 weight percent of PbO with from about 0.1 to about 5.0 weight percent of $In(OH)_3$; and (i) from about 0.5 to about 10.0 weight percent of PbO with from about 0.1 to about 5.0 weight percent of $Ga_2O_3$;

wherein the weight percentages are based upon the total weight of the zinc active material plus the binary additive mixture when the electrode is uncharged.

2. A zinc electrode in accordance with claim 1 wherein the binary additive mixture comprises from about 0.1 to about 5.0 weight percent of $Tl_2O_3$ with from about 0.5 to about 10.0 weight percent of PbO, wherein the weight percentages are based upon the total weight of the zinc active material plus the binary additive mixture.

3. A zinc electrode in accordance with claim 2 wherein $Tl_2O_3$ constitutes from 0.5 to 2.0 weight percent of the zinc active material plus the binary additive mixture.

4. A zinc electrode in accordance with claim 2 wherein the PbO constitutes from 1.0 to 5.0 weight percent of the zinc active material plus the binary additive mixture.

5. A zinc electrode in accordance with claim 4 wherein the $Tl_2O_3$ constitutes from 0.5 to 2.0 weight percent of the zinc active material plus the binary additive mixture.

6. A zinc electrode in accordance with claim 5, wherein $Tl_2O_3$ constitutes about 0.5 weight percent and PbO constitutes about 5.0 weight percent of the zinc active material plus the binary additive mixture.

7. A zinc electrode in accordance with claim 1 wherein the binary additive mixture comprises from about 0.1 to about 5.0 weight percent of $Tl_2O_3$ with from about 0.1 to about 5.0 weight percent of CdO, wherein the weight percentages are based upon the total weight of the zinc active material plus the binary additive mixture.

8. A zinc electrode in accordance with claim 7 wherein $Tl_2O_3$ constitutes from 0.5 to 2.0 weight percent of the zinc active material plus the binary additive mixture.

9. A zinc electrode in accordance with claim 7 wherein CdO constitutes from 0.5 to 2.0 weight percent of the zinc active material plus the binary additive mixture.

10. A zinc electrode in accordance with claim 9 wherein $Tl_2O_3$ constitutes from 0.5 to 2.0 weight percent of the zinc active material plus the binary additive mixture.

11. A zinc electrode in accordance with claim 1 wherein the binary additive mixture comprises from about 0.1 to about 5.0 weight percent of $Tl_2O_3$ with from about 0.1 to about 5.0 weight percent of $SnO_2$, wherein the weight percentages are based upon the total weight of the zinc active material plus the binary additive mixture.

12. A zinc electrode in accordance with claim 11 wherein $Tl_2O_3$ constitutes from 0.5 to 2.0 weight percent of the zinc active material plus the binary additive mixture.

13. A zinc electrode in accordance with claim 11 wherein $SnO_2$ constitutes from 0.5 to 2.0 weight percent of the zinc active material plus the binary additive mixture.

14. A zinc electrode in accordance with claim 13 wherein $Tl_2O_3$ constitutes from 0.5 to 2.0 weight percent of the zinc active material plus binary additive mixture.

15. A zinc electrode in accordance with claim 1 wherein the binary additive mixture comprises from about 0.1 to about 5.0 weight percent of $Tl_2O_3$ with from about 0.1 to about 5.0 weight percent of $In(OH)_3$, wherein the weight percentages are based upon the total weight of the zinc active material plus the binary additive mixture.

16. A zinc electrode in accordance with claim 15 wherein the $Tl_2O_3$ constitutes from 0.5 to 2.0 weight percent of the zinc active material plus the binary additive mixture.

17. A zinc electrode in accordance with claim 15 wherein the $In(OH)_3$ constitutes from 0.5 to 2.0 weight percent of the zinc active material plus the binary additive mixture.

18. A zinc electrode in accordance with claim 17 wherein the $Tl_2O_3$ constitutes from 0.5 to 2.0 weight percent of the zinc active material plus the binary additive mixture.

19. A zinc electrode in accordance with claim 1 wherein the binary additive mixture comprises from about 0.1 to about 5.0 weight percent of $Tl_2O_3$ with from about 0.1 to about 5.0 weight percent of $Ga_2O_3$, wherein the weight percentages are based upon the total weight of the zinc active material plus the binary additive mixture.

20. A zinc electrode in accordance with claim 19 wherein $Tl_2O_3$ constitutes from 0.5 to 2.0 weight percent of the zinc active material plus the binary additive mixture.

21. A zinc electrode in accordance with claim 19 wherein $Ga_2O_3$ constitutes from 0.5 to 2.0 weight percent of the zinc active material plus the binary additive mixture.

22. A zinc electrode in accordance with claim 21 wherein $Tl_2O_3$ constitutes from 0.5 to 2.0 weight percent of the zinc active material plus the binary additive mixture.

23. A zinc electrode in accordance with claim 1 wherein the binary additive mixture comprises from about 0.5 to about 10.0 weight percent of PbO with from about 0.1 to about 5.0 weight percent of CdO, wherein the weight percentages are based upon the total weight of the zinc active material plus the binary additive mixture.

24. A zinc electrode in accordance with claim 23 wherein PbO constitutes from 1.0 to 5.0 weight percent of the zinc active material plus the binary additive mixture.

25. A zinc electrode according to claim 23 wherein CdO constitutes from 0.5 to 2.0 weight percent of the zinc active material plus the binary additive mixture.

26. A zinc electrode according to claim 25 wherein PbO constitutes from 1.0 to 5.0 weight percent of the zinc active material plus the binary additive mixture.

27. A zinc electrode in accordance with claim 1 wherein the binary additive mixture comprises from about 0.5 to about 10.0 weight percent of PbO with from about 0.1 to about 5.0 weight percent of $SnO_2$, wherein the weight percentages are based upon the total weight of the zinc active material plus the binary additive mixture.

28. A zinc electrode in accordance with claim 27 wherein PbO constitutes from 1.0 to 5.0 weight percent of the zinc active material plus the binary additive mixture.

29. A zinc electrode in accordance with claim 27 wherein $SnO_2$ constitutes from 0.5 to 2.0 weight percent of the zinc active material plus the binary additive mixture.

30. A zinc electrode in accordance with claim 29, wherein PbO constitutes from 1.0 to 5.0 weight percent of the zinc active material plus the binary additive mixture.

31. A zinc electrode in accordance with claim 1 wherein the binary additive mixture comprises from about 0.5 to about 10.0 weight percent of PbO with from about 0.1 to about 5.0 weight percent of $In(OH)_3$, wherein the weight percentages are based upon the total weight of the zinc active material plus the binary additive mixture.

32. A zinc electrode in accordance with claim 31 wherein PbO constitutes from 1.0 to 5.0 weight percent of the zinc active material plus the binary additive mixture.

33. A zinc electrode in accordance with claim 31 wherein $In(OH)_3$ constitutes from 0.5 to 2.0 weight percent of the zinc active material plus the binary additive mixture.

34. A zinc electrode in accordance with claim 33 wherein PbO constitutes from 1.0 to 5.0 weight percent of the zinc active material plus the binary additive mixture.

35. A zinc electrode in accordance with claim 1 wherein the binary additive mixture comprises from about 0.5 to about 10.0 weight percent of PbO with from about 0.1 to about 5.0 weight percent of $Ga_2O_3$, wherein the weight percentages are based upon the total weight of the zinc active material plus the binary additive mixture.

36. A zinc electrode in accordance with claim 35 wherein PbO constitutes from 1.0 to 5.0 weight percent of the zinc active material plus the binary additive mixture.

37. A zinc electrode in accordance with claim 35 wherein $Ga_2O_3$ constitutes from 0.5 to 2.0 weight percent of the zinc active material plus the binary additive mixture.

38. A zinc electrode in accordance with claim 37 wherein PbO constitutes from 1.0 to 5.0 weight percent of the zinc active material plus the binary additive mixture.

39. A silver-zinc alkaline battery which comprises a silver cathode, a zinc anode, an alkaline electrolyte, and a separator between the anode and the cathode, the zinc anode containing a zinc active material and a binary additive mixture selected from the group consisting of:

(a) from about 0.1 to about 5.0 weight percent of $Tl_2O_3$ with from about 0.5 to about 10.0 weight percent of PbO;
(b) from about 0.1 to about 5.0 weight percent of $Tl_2O_3$ with from about 0.1 to about 5.0 weight percent of CdO;
(c) from about 0.1 to about 5.0 weight percent of $Tl_2O_3$ with from about 0.1 to about 5.0 weight percent of $SnO_2$;
(d) from about 0.1 to about 5.0 weight percent of $Tl_2O_3$ with from about 0.1 to about 5.0 weight percent of $In(OH)_3$;
(e) from about 0.1 to about 5.0 weight percent of $Tl_2O_3$ with from about 0.1 to about 5.0 weight percent of $Ga_2O_3$;
(f) from about 0.5 to about 10.0 weight percent of PbO with from about 0.1 to about 5.0 weight percent of CdO;
(g) from about 0.5 to about 10.0 weight percent of PbO with from about 0.1 to about 5.0 weight percent of $SnO_2$;
(h) from about 0.5 to about 10.0 weight percent of PbO with from about 0.1 to about 5.0 weight percent of $In(OH)_3$; and
(i) from about 0.5 to about 10.0 weight percent of PbO with from about 0.1 to about 5.0 weight percent of $Ga_2O_3$;

wherein the weight percentages are based upon the total weight of the zinc active material plus the binary additive mixture when the zinc anode is uncharged.

40. A battery in accordance with claim 39 wherein the binary additive mixture comprises from about 0.1 to about 5.0 weight percent of $Tl_2O_3$ with from about 0.5 to about 10.0 weight percent of PbO, wherein the weight percentages are based upon the total weight of the zinc active material plus the binary additive mixture when the zinc anode is uncharged.

41. A battery in accordance with claim 40 wherein the $Tl_2O_3$ constitutes from 0.5 to 2.0 weight percent of the zinc active material plus the binary additive mixture when the zinc anode is uncharged.

42. A battery in accordance with claim 40 wherein the PbO constitutes from 1.0 to 5.0 weight percent of the zinc active material plus the binary additive mixture when the zinc anode is uncharged.

43. A battery in accordance with claim 42 wherein the $Tl_2O_3$ constitutes from 0.5 to 2.0 weight percent of the zinc active material plus the binary additive mixture when the zinc anode is uncharged.

44. A battery in accordance with claim 43 wherein $Tl_2O_3$ constitutes about 0.5 weight percent and PbO constitutes about 1.0 weight percent of the zinc active material plus the binary additive mixture when the zinc anode is uncharged.

45. A battery in accordance with claim 39 wherein the binary additive mixture comprises from about 0.1 to about 5.0 weight percent of $Tl_2O_3$ with from about 0.1 to about 5.0 weight percent of CdO, wherein the weight percentages are based upon the total weight of the zinc active material plus the binary additive mixture when the zinc anode is uncharged.

46. A battery in accordance with claim 45 wherein the $Tl_2O_3$ constitutes from 0.5 to 2.0 weight percent of the zinc active material plus the binary additive mixture when the zinc anode is charged.

47. A battery in accordance with claim 45 wherein the CdO constitutes from 0.5 to 2.0 weight percent of the zinc active material plus the binary additive mixture when the zinc anode is uncharged.

48. A battery in accordance with claim 47 wherein the $Tl_2O_3$ constitutes from 0.5 to 2.0 weight percent of the zinc active material plus the binary additive mixture when the zinc anode is uncharged.

49. A battery in accordance with claim 39 wherein the binary additive mixture comprises from about 0.1 to about 5.0 weight percent of $Tl_2O_3$ with from about 0.1 to about 5.0 weight percent of $SnO_2$, wherein the weight percentages are based upon the total weight of the zinc active material plus the binary additive mixture when the zinc is uncharged.

50. A battery in accordance with claim 49 wherein the $Tl_2O_3$ constitutes from 0.5 to 2.0 weight percent of the zinc active material plus the binary additive mixture when the zinc anode is uncharged.

51. A battery in accordance with claim 49 wherein the $SnO_2$ constitutes from 0.5 to 2.0 weight percent of the zinc active material plus the binary additive mixture when the zinc anode is uncharged.

52. A battery in accordance with claim 51 wherein the $Tl_2O_3$ constitutes from 0.5 to 2.0 weight percent of the zinc active material plus the binary additive mixture when the zinc anode is uncharged.

53. A battery in accordance with claim 39 wherein the binary additive mixture comprises from about 0.1 to about 5.0 weight percent of $Tl_2O_3$ with from about 0.1 to about 5.0 weight percent of $In(OH)_3$, wherein the weight percentages are based upon the total weight of the zinc active material plus the binary additive mixture when the zinc anode is uncharged.

54. A battery in accordance with claim 53 wherein the $Tl_2O_3$ constitutes from 0.5 to 2.0 weight percent of the zinc active material plus the binary additive mixture when the zinc anode is uncharged.

55. A battery in accordance with claim 53 wherein the $In(OH)_3$ constitutes from 0.5 to 2.0 weight percent of the zinc active material plus the binary additive mixture when the zinc anode is uncharged.

56. A battery in accordance with claim 55 wherein the $Tl_2O_3$ constitutes from 0.5 to 2.0 weight percent of the zinc active material plug the binary additive mixture when the zinc anode is uncharged.

57. A battery in accordance with claim 39 wherein the binary additive mixture comprises from about 0.1 to about 5.0 weight percent of $Tl_2O_3$ with from about 0.1 to about 5.0 weight percent of $Ga_2O_3$, wherein the weight percentages are based upon the total weight of the zinc active material plus the binary additive mixture when the zinc anode is uncharged.

58. A battery in accordance with claim 57 wherein the $Tl_2O_3$ constitutes from 0.5 to 2.0 weight percent of the zinc active material plus the binary additive mixture when the zinc anode is uncharged.

59. A battery in accordance with claim 57 wherein the $Ga_2O_3$ constitutes from 0.5 to 2.0 weight percent of the zinc active material plus the binary additive mixture when the zinc anode is uncharged.

60. A battery in accordance with claim 59 wherein the $Tl_2O_3$ constitutes from 0.5 to 2.0 weight percent of the zinc active material plus the binary additive mixture when the zinc anode is uncharged.

61. A battery in accordance with claim 39 wherein the binary additive mixture comprises from about 0.5 to about 10.0 weight percent of PbO with from about 0.1 to about 5.0 weight percent of CdO, wherein the weight percentages are based upon the total weight of the zinc active material plus the binary additive mixture when the zinc anode is uncharged.

62. A battery in accordance with claim 61 wherein the PbO constitutes from 1.0 to 5.0 weight percent of the zinc active material plus the binary additive mixture when the zinc anode is uncharged.

63. A battery in accordance with claim 61 wherein the CdO constitutes from 0.5 to 2.0 weight percent of the zinc active material plus the binary additive mixture when the zinc anpode is uncharged.

64. A battery in accordance with claim 63 wherein the PbO constitutes from 1.0 to 5.0 weight percent of the zinc active material plus the binary additive mixture when the zinc anode is uncharged.

65. A battery in accordance with claim 39 wherein the binary additive mixture comprises from about 0.5 to about 10.0 weight percent of PbO with from about 0.1 to about 5.0 weight percent of $SnO_2$, wherein the weight percentages are based upon the total weight of the zinc active material plus the binary mixture when the zinc anode is uncharged.

66. A battery in accordance with claim 65 wherein the PbO constitutes from 1.0 to 5.0 weight percent of the zinc active material plus the binary additive mixture when the zinc anode is uncharged.

67. A battery in accordance with claim 65 wherein the $SnO_2$ constitutes from 0.5 to 2.0 weight percent of the zinc active material plus the binary additive mixture when the zinc anode is uncharged.

68. A battery in accordance with claim 67 wherein PbO constitutes from 1.0 to 5.0 weight percent of the zinc active material plus the binary additive mixture when the zinc anode is uncharged.

69. A battery in accordance with claim 39 wherein the binary additive mixture comprises from about 0.5 to about 10.0 weight percent of PbO with from about 0.1 to about 5.0 weight percent of $In(OH)_3$, wherein the weight percentages are based upon the total weight of the zinc active material plus the binary additive mixture when the zinc anode is uncharged.

70. A battery in accordance with claim 69 wherein PbO constitutes from 1.0 to 5.0 weight percent of the zinc active material plus the binary additive mixture when the zinc anode is uncharged.

71. A battery in accordance with claim 69 wherein $In(OH)_3$ constitutes from 0.5 to 2.0 weight percent of the zinc active material plus the binary additive mixture when the zinc anode is uncharged.

72. A battery in accordance with claim 71 wherein PbO constitutes from 1.0 to 5.0 weight percent of the zinc active material plus the binary additive mixture when the zinc anode is uncharged.

73. A battery in accordance with claim 39 wherein the binary additive mixture comprises from about 0.5 to about 10.0 weight percent of PbO with from about 0.1 to about 5.0 weight percent of $Ga_2O_3$, wherein the weight percentages are based upon the total weight of the zinc active material plus the binary additive mixture when the zinc anode is uncharged.

74. A battery in accordance with claim 73 wherein PbO constitutes from 1.0 to 5.0 weight percent of the zinc active material plus the binary additive mixture when the zinc anode is uncharged.

75. A battery in accordance with claim 73 wherein $Ga_2O_3$ constitutes from 0.5 to 2.0 weight percent of the zinc active material plus binary additive mixture when the zinc anode is uncharged.

76. A battery in accordance with claim 75 wherein PbO constitutes from 1.0 to 5.0 weight percent of the zinc active material plus the binary additive mixture when the zinc anode is uncharged.

* * * * *